United States Patent
Fitch et al.

(10) Patent No.: US 8,189,575 B2
(45) Date of Patent: May 29, 2012

(54) MODULAR SCALABLE SWITCH ARCHITECTURE

(75) Inventors: Timothy Fitch, Sunnyvale, CA (US); Curtis Santos, Santa Clara, CA (US); Rudolph Maske, San Jose, CA (US); Zenon Kuc, San Jose, CA (US)

(73) Assignee: Rockstar Bidco, L.P., New York, NY (US)

( * ) Notice: Subject to any disclaimer, the term of this patent is extended or adjusted under 35 U.S.C. 154(b) by 752 days.

(21) Appl. No.: 11/374,546

(22) Filed: Mar. 13, 2006

(65) Prior Publication Data
US 2007/0211712 A1  Sep. 13, 2007

(51) Int. Cl.
*H04Q 11/00* (2006.01)
*H04L 12/28* (2006.01)
(52) U.S. Cl. .................................. 370/388; 370/389
(58) Field of Classification Search .................... 370/388
See application file for complete search history.

(56) References Cited

U.S. PATENT DOCUMENTS

| 7,180,908 | B2* | 2/2007 | Valavi et al. ............. 370/465 |
| 7,233,242 | B2* | 6/2007 | Elliott et al. ............ 340/539.21 |
| 7,420,968 | B2* | 9/2008 | Donoghue et al. ......... 370/387 |
| 2005/0105560 | A1* | 5/2005 | Mann et al. ............. 370/503 |
| 2005/0188416 | A1* | 8/2005 | Halna Du Fretay et al. .. 725/117 |

* cited by examiner

*Primary Examiner* — Melanie Jagannathan
(74) *Attorney, Agent, or Firm* — Christopher & Weisberg, P.A.

(57) ABSTRACT

A scalable Ethernet switch includes modules which can be interconnected to provide a single, virtual switch. The modules may be of uniform physical size and shape relative to a standard telecommunications rack. When greater capacity is required, an additional module is mounted in a rack and interconnected with the other modules, e.g., in a bi-directional ring. Enhanced port density is provided by interconnecting the modules with 12 GbE links which operate on standard 10 GbE wiring and connectors. Consequently, throughput between modules in increased relative to standard 10 GbE links without increasing form factor. Further, transmission power control can be implemented such that modules of the virtual switch may be physically adjacent or separated by distances of several meters.

16 Claims, 3 Drawing Sheets

MODULAR SCALABLE SWITCH ARCHITECTURE

FIELD OF THE INVENTION

This invention relates generally to the field of network communications, and more particularly to scalable switches.

BACKGROUND OF THE INVENTION

Historically, service providers have expended considerable effort to estimate equipment requirements, including how those requirements will change over time, in order to minimize cost while accommodating demand. Accurate estimation was important because over-estimating requirements could lead to over-provisioning with costly equipment. If, for example, a service provider estimates that for a given location there will be a requirement for equipment capable of throughput X for the first few years following introduction of a service, and that equipment capable of throughput 100X may be required within ten years, then it may not be economically rational to install the equipment capable of throughput 100X at service introduction. Rather, the service provider may wish to increase capacity gradually in relation to increased demand. However, there are practical limitations to gradually increasing capacity. First, each installation of new equipment has an overhead cost apart from that of the equipment itself, so it is desirable to reduce the frequency of new installations. Second, if increasing capacity requires that lower capacity equipment is replaced with higher capacity equipment then each capacity increase may produce excess equipment for which there may be no profitable use.

Scalable equipment mitigates some of the problems described above by facilitating gradual increases in capacity. One technique for creating a scalable switch is to use multiple I/O line cards interconnected via a backplane and switch fabric. The switch can then be scaled-up by adding line cards. Advantages of this technique include ease of installation and not producing excess equipment. However, the chassis which houses the fabric and line cards is typically of a size capable of accommodating a full complement of line cards. Hence, there is size inefficiency in a partially empty chassis. Such size inefficiency is a problem where space is costly. Size inefficiency is particularly problematic in markets where competing service providers co-locate equipment, and relatively newer providers rent space from incumbent service providers. It would therefore be desirable to have equipment that could scale gradually in physical size and capacity without producing excess equipment and without requiring complex installation.

SUMMARY OF THE INVENTION

In accordance with one embodiment of the invention, a scalable network device comprises: a plurality of switch modules, each switch module having at least one internal port and at least one external port, wherein the external ports operate at a standard line rate and the internal ports operate at a non-standard line rate, the non-standard line rate internal ports being implemented with connectors rated at a line rate lower than the non-standard line rate.

In accordance with another embodiment of the invention, a method for scaling capacity of a network device comprises the steps of: adding, to the device, additional switching modules, each switching module having at least one internal port and at least one external port, wherein the external ports operate at a standard line rate and the internal ports operate at a non-standard line rate, the non-standard line rate internal ports being implemented with connectors rated at a line rate lower than the non-standard line rate.

DETAILED DESCRIPTION

Figure 1:
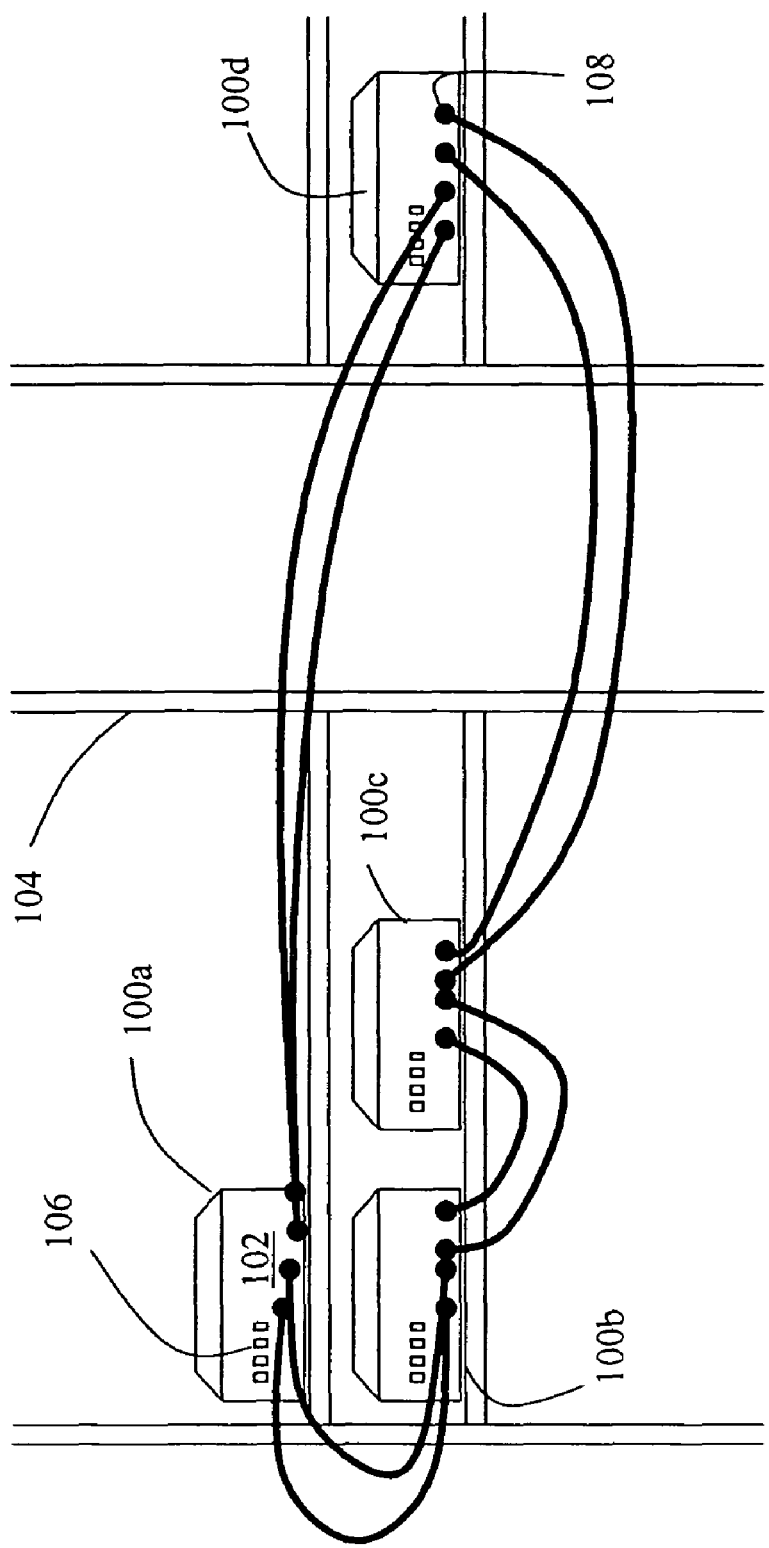
FIG. 1 is a diagram of a scalable, non-blocking switch architecture including modules interconnected in a ring.
Figure 2:
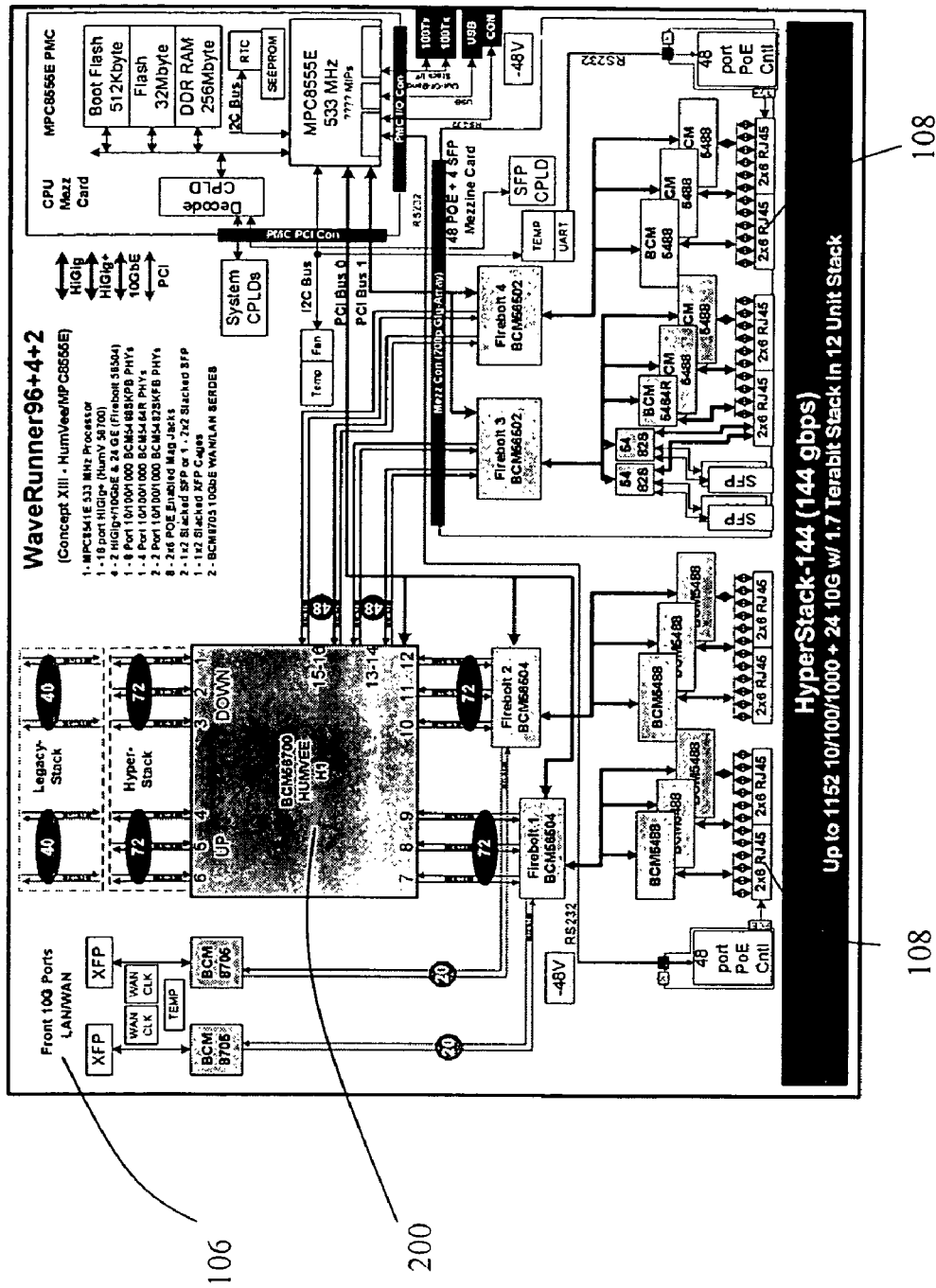
FIG. 2 is a block diagram of a switch module of FIG. 1.
Figure 3:
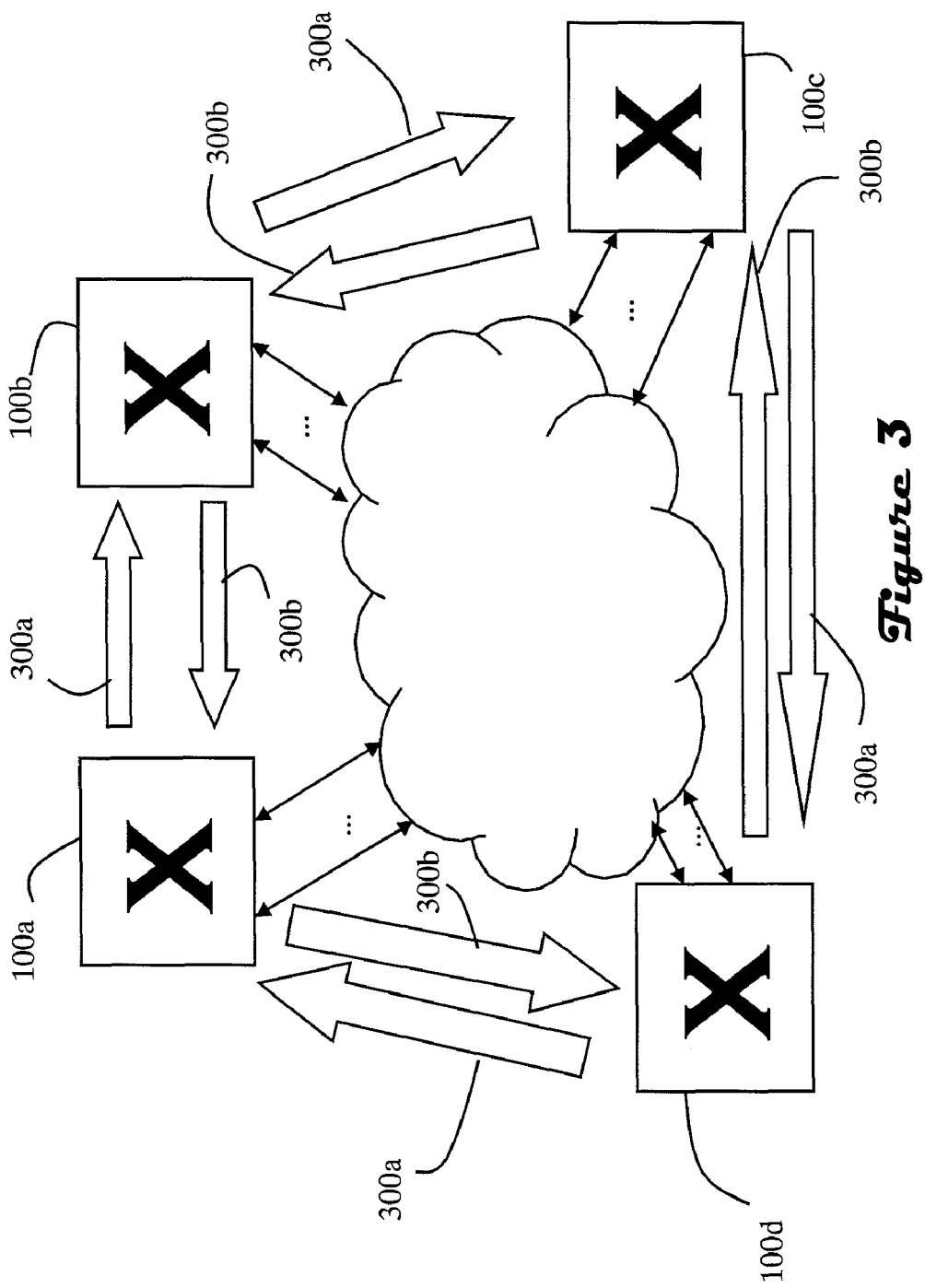
FIG. 3 illustrates the interconnections between the switch modules and the network in greater detail.

Referring to FIGS. 1, 2 and 3, a scalable, non-blocking switch includes at least one module (100a) which is both independently and interdependently functional as a switch. The switch is scaled by adding more modules (100b, 100c, 100d). In the illustrated embodiment, up to twelve modules may be combined in a single switch. Each module is housed in a separate chassis (102) having a form factor designed to efficiently use the standard amount of space available in a telecommunications rack (104).

In the illustrated embodiment, when multiple modules (100a-d) are employed to provide a single, scaled-up switch, the individual modules are interconnected in a ring architecture. The ring includes two bidirectional logical links (300a, 300b) each flowing in opposing directions around the overall interconnect ring, thereby providing protection from link or node failure. For example, if switch (100a) fails then traffic bound for switch (100d) from switch (100b) can reach switch (100d) by being redirected via switch (100c).

Each module (100a-d) includes a plurality of external ports (106) operable to interconnect with other network devices, i.e., network devices other than the modules of the switch. These external ports employ standard connectors, such as RJ45 connectors, and support standard link line rates such as 1 gigabit ("Gb") per second and 10 Gbps. Typically, subsets of the entire set of external ports will be used to provide different line rates.

Internal ports (108) are available for interconnection with other modules of the switch. These ports are "internal" in the sense that they are dedicated to communications with other modules of the switch. Unlike the external ports, at least some of the internal ports support non-standard Ethernet links which operate at a line rate. of 12 Gb. The 12 GbE internal links utilize standard 12× Infiniband™ connectors and 12× twin-axial cabling. Hence, the form factor relative to 10 GbE links is unchanged, although throughput is increased. This increase in throughput without a corresponding increase in form factor permits the switch to scale better. In particular, more modules may be added without unacceptable degradation in performance relative to 10 GbE links. Further, the use of 12 Gb links simplifies implementation where the chipset has native 12 Gb links for chip-to-chip communication. Still further, the 12 Gb links may be backward compatible with 10 Gb links supported by legacy equipment. The illustrated embodiment has one 12× Infiniband™ connector for each direction in the ring. The 12× Infiniband™ connectors may have a rated capacity of 10 Gb but be capable of 12 Gb communication at the relatively short distances between switch modules.

Programmable power control enables flexible installation of the switch modules (100a-d). Unlike switches which scale by adding line cards, for which distances between card slots are known in advance, it is not generally known in advance what rack space will be available when adding a switch module. It may be possible to mount modules adjacent to one another in some circumstances, and it may be necessary to mount a module several meters away from other modules in other circumstances. In order to accommodate differences in distance (and length of cabling) between modules, each module is equipped with programmable, per-port transmission power control. For example, an Application Specific Integrated Circuit (ASIC) (200) may be operable in response to input from a field technician of the length of cabling to index into a table to obtain a transmission power level.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. A scalable network device comprising:
a plurality of switch modules, each switch module having at least one internal port and at least one external port, wherein the external ports operate at a standard line rate and the internal ports operate at a non-standard line rate, the non-standard line rate internal ports being implemented with connectors rated at a line rate lower than the non-standard line rate such that connector rating is exceeded during operation, and wherein the internal ports are employed for communication between switch modules and the external ports are employed for communication with devices other than switch modules of the switch.

2. The device of claim 1 wherein the switch modules are interconnected in a ring having at least first and second logical links that operate in opposing direction.

3. The device of claim 1 wherein each module independently switches at least some traffic.

4. The device of claim 1 wherein each of the switch modules has a chassis, and the chassis each has the same dimensions.

5. The device of claim 1 wherein the internal ports are backward compatible with a lesser standard line rate.

6. The device of claim 1 wherein the length of cabling between switch modules differs between module pairs.

7. The device of claim 6 wherein each module includes at least one chip that operates to set transmission power level on at least one internal port.

8. The device of claim 7 wherein the chip operates in response to an indication of cabling length to select a transmission power level.

9. A method for scaling capacity of a network device comprising the steps of:
adding, to the device, additional switching modules, each switching module having at least one internal port and at least one external port, wherein the external ports operate at a standard line rate and the internal ports operate at a non-standard line rate, the non-standard line rate internal ports being implemented with connectors rated at a line rate lower than the non-standard line rate such that connector rating is exceeded during operation, and wherein the internal ports are employed for communication between switching modules and the external ports are employed for communication with devices other than switching modules of the switch.

10. The method of claim 9 including the further step of interconnecting the switching modules in a ring having at least first and second logical links that operate in opposing direction.

11. The method of claim 9 wherein each switching module independently switches at least some traffic.

12. The method of claim 9 wherein each of the switch modules has a chassis, and the chassis each has the same dimensions.

13. The method of claim 9 wherein the internal ports are backward-compatible with a lesser standard line rate.

14. The method of claim 9 wherein the length of cabling between switching modules differs between module pairs.

15. The method of claim 14 including the further step of setting transmission power level on at least one internal port.

16. The method of claim 15 including the further step of selecting a transmission power level in response to an indication of cabling length.

* * * * *